April 17, 1934.　　　I. S. RAYMER　　　1,955,473
SAFETY APPLIANCE FOR BRAKEMEN
Filed June 30, 1933　　2 Sheets-Sheet 1

INVENTOR
Ira S. Raymer
BY
HIS ATTORNEY

April 17, 1934.　　　I. S. RAYMER　　　1,955,473

SAFETY APPLIANCE FOR BRAKEMEN

Filed June 30, 1933　　2 Sheets-Sheet 2

INVENTOR
Ira S. Raymer
BY
HIS ATTORNEY

Patented Apr. 17, 1934

1,955,473

UNITED STATES PATENT OFFICE 1,955,473

SAFETY APPLIANCE FOR BRAKEMEN

Ira S. Raymer, Beaver, Pa.

Application June 30, 1933, Serial No. 678,484

4 Claims. (Cl. 227—8)

My invention relates to safety appliances for brakemen.

I will describe one form of safety appliance embodying my invention, and will then point out the novel features thereof in claims.

Figure 1:
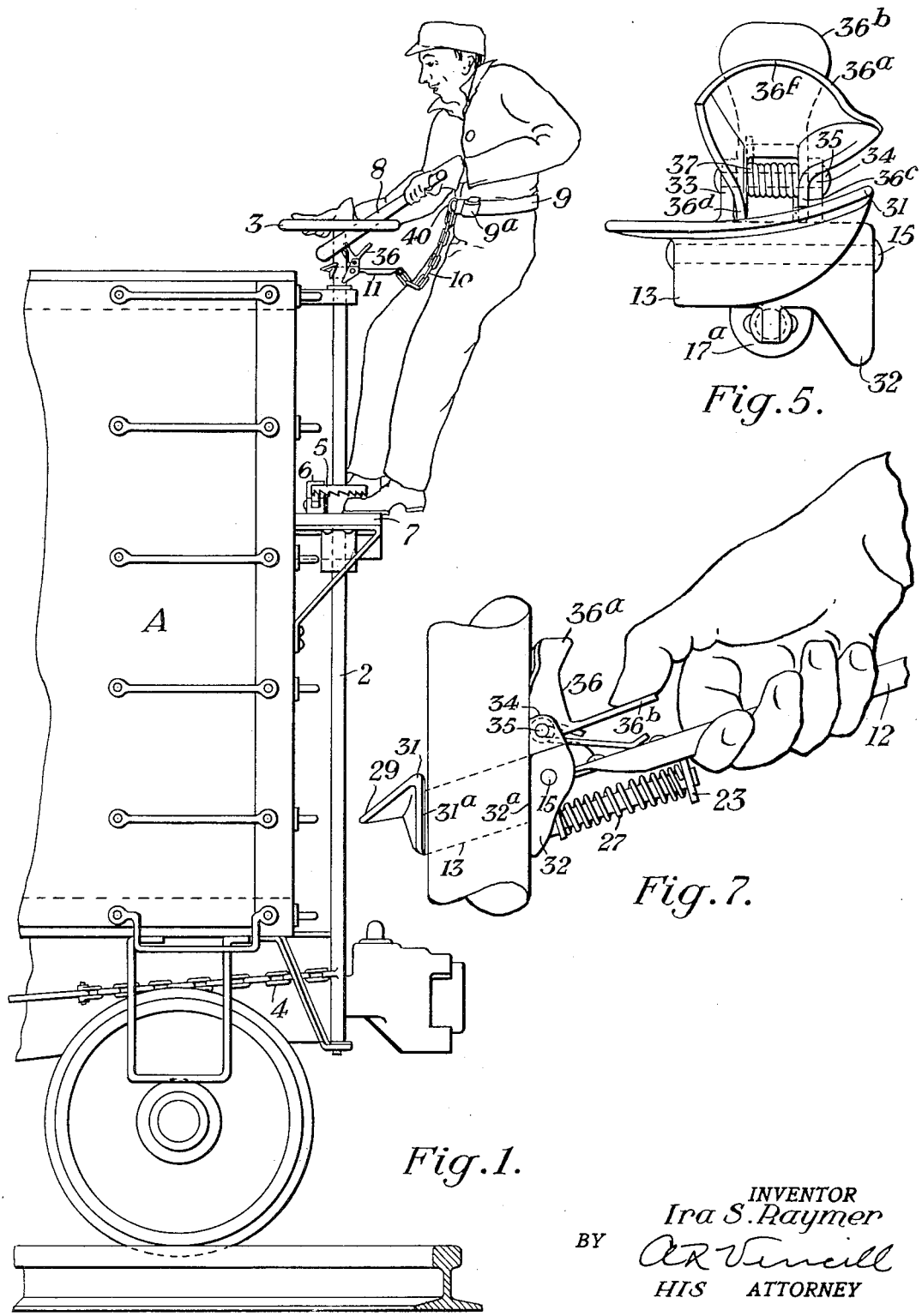
Figure 2:
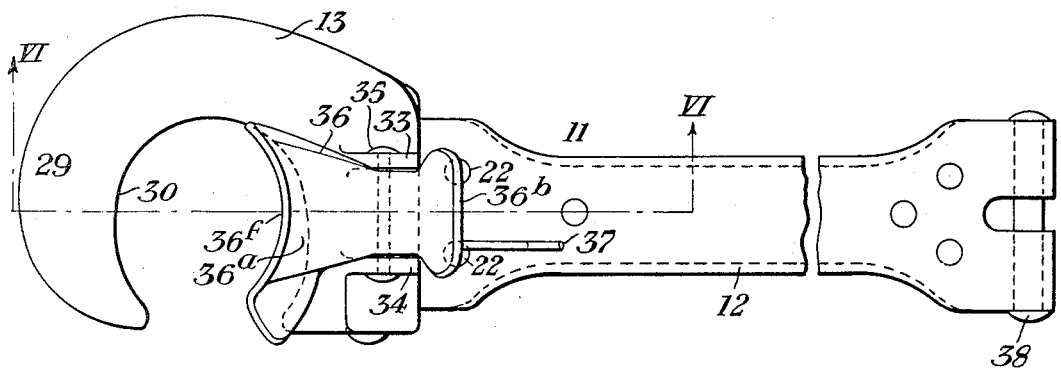
Figure 3:
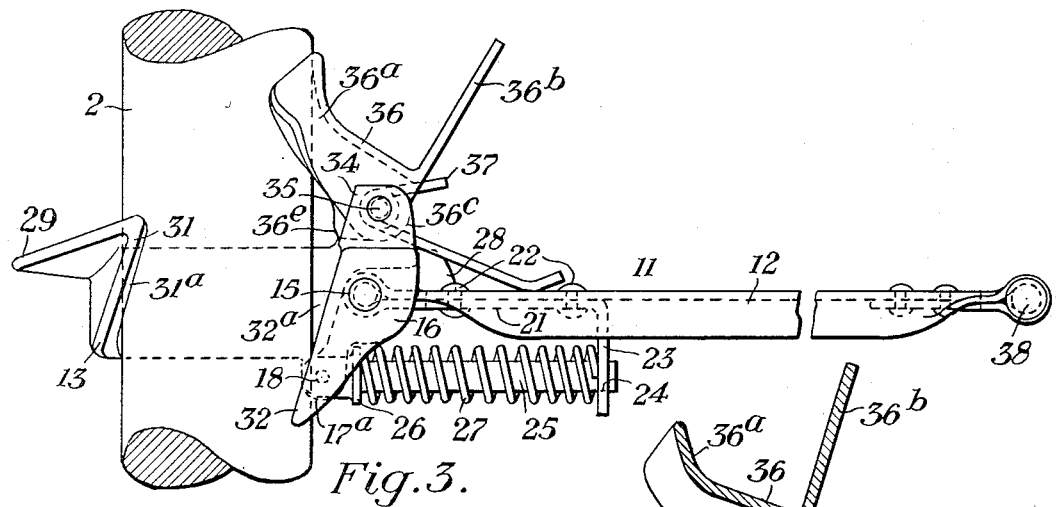
Figures 4, 6:
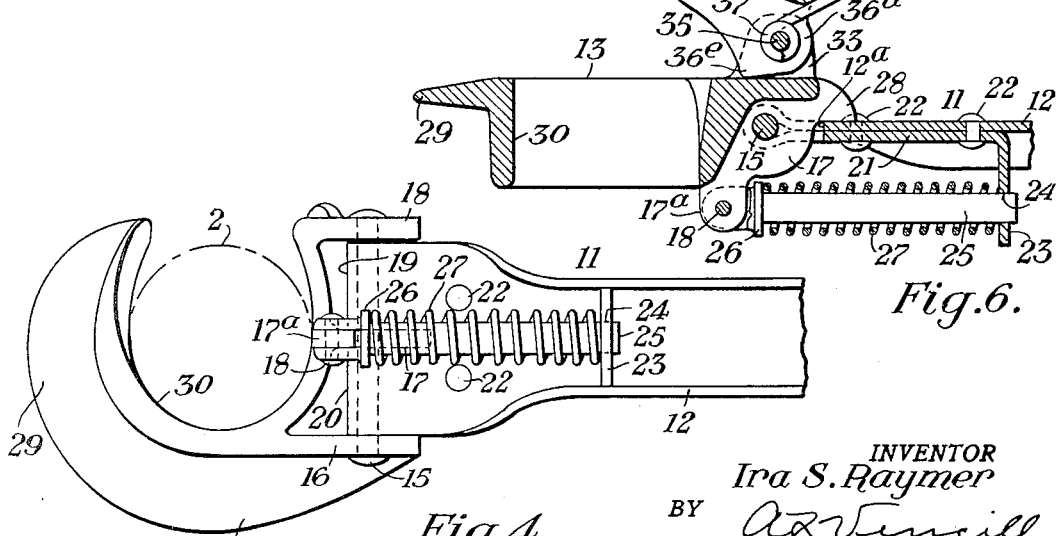

In the accompanying drawings, Fig. 1 is a view showing in side elevation a brakeman provided with a safety appliance embodying my invention operating the hand brakes of a freight car. Fig. 2 is an enlarged top plan view of the device 11 forming part of the appliance shown in Fig. 1. Fig. 3 is a side view of the device shown in Fig. 2. Fig. 4 is a bottom view of a portion of the device shown in Fig. 2. Fig. 5 is a left-hand end view of the device shown in Fig. 2. Fig. 6 is a sectional view taken on the line VI—VI of Fig. 2. Fig. 7 is a perspective view showing the manner in which the device 11, shown in the preceding views, is placed on the brake shaft 2.

Similar reference characters refer to similar parts in each of the several views.

Referring first to Fig. 1, the reference character A designates, in general, a freight car which may be any one of the usual types of freight cars, but which is here illustrated for convenience as an ordinary coal car. The car A is provided with the customary hand brake equipment including a vertical brake shaft 2 provided at its upper end with a brake wheel 3, and operatively connected at its lower end with a brake chain 4. The brake shaft 2 is also provided with the usual ratchet wheel 5 which cooperates with a ratchet pawl 6 pivotally mounted on a brake step 7. The brake step 7 is secured to the end of the car A in accordance with standard practice, and is provided with a suitable hole through which the brake shaft passes.

As is well known, in applying the brakes on a car of the type described, a brakeman stands on the brake step 7 and rotates the brake wheel 3, usually with the aid of a brakeman's club 8 in the manner shown. While he is doing this, it sometimes happens that he loses his hold on the brake wheel rather suddenly, due for example to his brake club slipping or breaking, the brake chain 4 breaking, or to a locked brake jerking loose. When a brakeman loses his hold on the brake wheel in this manner, he is likely to fall off the car and seriously injure himself. Furthermore, the brakeman is also likely to fall off the car due to precarious footing caused by moisture, snow, or sleet on the brake step 7, or to any one of a number of other causes which are too obvious to require specific enumeration.

To prevent such falls, I provide a novel safety appliance comprising a belt 9 which is adapted to be worn on the person of the brakeman in the manner shown in Fig. 1, and which is connected by means of a suitable flexible connection, such as a chain 10, with a device 11 which may be readily attached to or detached from the brake shaft 2. The belt 9 may be of any suitable type, and in itself forms no part of my present invention, except in so far as it cooperates with the other parts to make up the appliance as a whole.

Referring now also to Figs. 2 to 7, inclusive, the device 11 comprises a rigid arm 12, and a member 13 which is attached to one end of the arm 12 by means of a hinged connection including a hinge pin 15. The hinge pin 15 is mounted in three spaced depending lugs 16, 17 and 18 formed on the underside of the member 13 at its rear end, and passes through two bearings 19 and 20 on the arm 12, which bearings are disposed between the middle lug 17 and the two side lugs 16 and 18, respectively. The bearings 19 and 20 may be provided on the arm 12 in any suitable manner but, as here shown, these bearings are formed by bending a portion 21 (see Fig. 6) of the arm over unto itself and riveting it to the main part of the arm by means of rivets 22, and then cutting an axially extending slot 12ª in the arm, which slot is just wide enough to receive the central lug 17 with sufficient clearance to avoid excessive friction.

The tip of the bent-over portion 21 is bent downwardly at right angles to the remainder of the bent-over portion in the manner shown in Figs. 3 and 6 to form a lug 23, and provided in this lug is a hole 24 which slidably receives one end of a rod 25. The other end of the rod 25 is pivotally attached to an extension 17ª of the lug 17 on the member 13 by means of a pin 18, and surrounding the rod 25 between the lug 23 and a shoulder 26 formed on the rod is a compressed coil spring 27 which constantly biases the member 13 and arm 12 to the relative positions in which the upper side of the arm 12 engages a stop 28 which projects rearwardly from the lug 17, as shown in Fig. 6. The parts are so proportioned that when the arm 12 is engaging the stop 28, the plane of the arm will be parallel to the plane of the member 13.

Provided on the forward end of the member 13 is a hook-shaped return bend 29 which, together with the body of the member, forms a recess 30. This recess is semicylindrical and substantially vertical, and is of such size that it will loosely receive the brake shaft 2. The member 13 is further provided with two oppositely extending lips 31 and 32 which are located on opposite sides of the mouth of the recess 30, and the confronting faces 31ª and 32ª of which form a continuation of the recess. The lips 31 and 32 are inclined at an acute angle to the plane of the member 13, and are so disposed and are of such length that the member 13 can only be placed on, or removed from, the brake shaft 2 when the member is inclined at an angle to the shaft, as shown in Fig. 7. The reason for this construction will become apparent as the description proceeds.

The device 11 also comprises a latch 36 which is pivoted on a pin 35 mounted in a pair of spaced upstanding lugs 33 and 34 provided on the rear end of the member 13. As here shown, the latch 36 is punched and bent from a single piece of material, and is formed with a forwardly projecting shaft engaging portion 36ª, a rearwardly projecting thumb engaging portion 36ᵇ which is disposed at an angle of substantially 90° to the shaft engaging portion, and with two depending lugs 36ᶜ and 36ᵈ which are apertured to receive the pin 35. Surrounding the pin 35 is a spring 37, one end of which engages the member 13 and the other end of which engages the latch in such manner that the latch is constantly biased to its latching position, in which position it is shown in Fig. 3. A stop 36ᵉ (see Fig. 6) is formed on the forward side of the lug 36ᵈ and cooperates with the upper side of the member 13 to limit the position to which the latch can rotate in response to the bias of the spring 37 when the member 13 is not engaging the brake shaft. The shaft engaging portion 36ª of the latch 36 is rounded at 36ᶠ, as shown in Fig. 2, to cause it to snugly engage the brake shaft, and has one side thereof flared outwardly and bent rearwardly a certain amount to facilitate placing the member 13 on the brake shaft. The parts are so proportioned that when the member 13 is in place on the brake shaft and the latch 36 is released, the device 11 will be held in a substantially horizontal position on the shaft. The parts are further so proportioned that when the member 13 is in place on the brake shaft and the latch is released, the latch will exert sufficient pressure on the shaft to prevent the device 11 from slipping downwardly on the shaft, but will at the same time permit the shaft to rotate within the device with a comparatively small amount of friction.

The end of the arm 12 opposite to that which is attached to the member 13 is attached to one end of the chain 10 by means of a pin 38 in a manner which will be obvious from the drawing, and the other end of the chain 10 is attached to a metal ring 40 secured to the belt 9. The length of the arm 12 and chain 10 are such that they will effectively prevent the chain 10 from winding around the brake shaft when the brake shaft revolves with the device 11 attached thereto.

In operation, when the brakeman is performing other duties than those incident to applying the brakes to a car, the device 11 is placed, chain end down, within a belt loop 9ª that is provided on the belt 9 for this purpose, and it will be apparent that under these conditions, the safety appliance will in no way interfere with the brakeman's freedom of movement. As soon, however, as the brakeman climbs up onto a car to operate the hand brakes, he immediately removes the device 11 from the loop 9ª and hooks it onto the brake shaft. In hooking the device onto the brake shaft, the device is held in an inclined position, using the arm 12 as a handle in the manner shown in Fig. 7, and the latch 36 is rotated to a position in which it is out of the way of the brake shaft by means of the thumb piece 36ᵇ until the shaft is fully within the recess 30 in the member 13, after which the latch is released. When the latch is released, the device immediately assumes a horizontal position, causing the lips 31 and 32 to partly encircle the shaft in such a way that it is impossible for the device to become accidentally disengaged from the shaft. As soon as the device 11 is in place on the shaft, the brakeman may apply the brakes in the usual manner, and if he loses his hold on the brake wheel 3, he will be prevented from falling off the car by the device in an obvious manner. When the brakeman has finished applying the brakes to the car, the device 11 is removed from the brake shaft and replaced in the belt loop 9ª.

It should be noted that due to the fact that the arm 12 is hinged to the member 13 in the manner shown and described, if a brakeman starts to fall, the arm 12, instead of becoming bent and damaging the device 11, as would be the case if this arm were rigidly attached to the member 13, will deflect downwardly, and the greater part of the force which is exerted on the arm will then become a longitudinal pull which will not in any way injure the device. It should also be noted that when the arm is bent downwardly, the resultant force which is exerted on the member 13 causes this member to grasp the brake shaft 2 more tightly, which prevents the member from slipping downwardly on the shaft under these conditions.

One advantage of a safety appliance embodying my invention is that it is convenient to use, and does not in any way interfere with the brakeman's freedom of movement.

Another advantage of a safety appliance embodying my invention is that it is inexpensive to manufacture and at the same time is highly efficient for its intended purpose.

Although I have herein shown and described only one form of safety appliance embodying my invention, it is understood that various changes and modifications may be made therein within the scope of the appended claims without departing from the spirit and scope of my invention.

Having thus described my invention, what I claim is:

1. A brakeman's safety appliance comprising a member adapted to be detachably secured to the vertical hand brake shaft of a freight car in such manner that the shaft is free to turn within the member, a rigid arm pivotally connected with said member to swing downwardly from a horizontal position when the member is secured to the brake shaft, means for biasing said arm to substantially the horizontal position, a safety belt adapted to be worn on the person of the brakeman, and a flexible member connecting said belt and the free end of said arm.

2. A brakeman's safety appliance comprising a member provided with a recess adapted to loosely receive the hand brake shaft of a freight car, a latch pivotally attached to said member and biased to a latching position in which it prevents said member from becoming accidentally removed from said shaft when said member has once been placed on said shaft, an arm secured to said member and forming a handle for said device, a safety belt adapted to be worn by the brakeman, and a flexible connecting member connecting said belt and said arm.

3. A brakeman's safety appliance comprising a member provided at its forward end with a hook-shaped return bend forming with the body of said member a vertical recess which is adapted to loosely receive the hand brake shaft of a freight car, oppositely extending lips provided on said member on opposite sides of the mouth of said recess and having confronting faces which form a continuation of said recess, said lips being disposed at an angle with respect to the plane of said member in such manner that said member can be placed on or removed from said shaft when and only when said member is inclined at an angle to the shaft, a latch pivotally attached to the rear end of said member and provided with a rounded portion adapted to engage said shaft, means for biasing said latch to a position in which said rounded portion engages said shaft, the parts being so proportioned that when said latch is engaging said shaft said member is held in a substantially horizontal position on said shaft but is free to turn on said shaft, a belt adapted to be worn by the brakeman, and means including a flexible connecting member for connecting said belt and said other member.

4. A brakeman's safety appliance comprising a rigid member provided at its forward end with a hook-shaped return bend forming with the body of said member a vertical recess which is adapted to loosely receive the hand brake shaft of a freight car, oppositely extending lips formed on said member on opposite sides of the mouth of said recess and disposed at an angle to the plane of said member in such manner that said member can be placed on or removed from said shaft when and only when said member is inclined at an acute angle to the axis of said shaft and that when said member is in a horizontal position on said shaft said lips will partly encircle said shaft, a latch pivotally attached to said member and provided with a rounded shaft engaging portion, means for biasing said latch to a position in which said latch will engage said shaft at said rounded shaft engaging portion when said member is on said shaft, the parts being so proportioned that when said latch is engaging said shaft said member will be held in a substantially horizontal position on said shaft, whereby said member is prevented from becoming accidentally disengaged from said shaft, a rigid arm connected at one end with said member by a hinged connection in such manner that said arm is free to rotate downwardly in a plane parallel to the axis of said shaft, said arm being biased to such a position with respect to said member that when said member is on said shaft said arm will extend at right angles to said shaft, a belt adapted to be worn by the brakeman, and a flexible chain secured at one end to said belt and at the other end to said arm, the parts being further so proportioned that when said shaft is rotated said member will turn on said shaft and said arm will prevent said chain from winding around said shaft.

IRA S. RAYMER.